3,183,739
INDEXING DEVICE
Z. Ted Rajewski, Richmond, Ind., and Robert W. Navarro, Cincinnati, Ohio; said Z. Ted Rajewski, now by change of name Ted Rajewski, assignors to the United States of America as represented by the Secretary of the Air Force
Filed Apr. 6, 1962, Ser. No. 185,767
2 Claims. (Cl. 74—527)

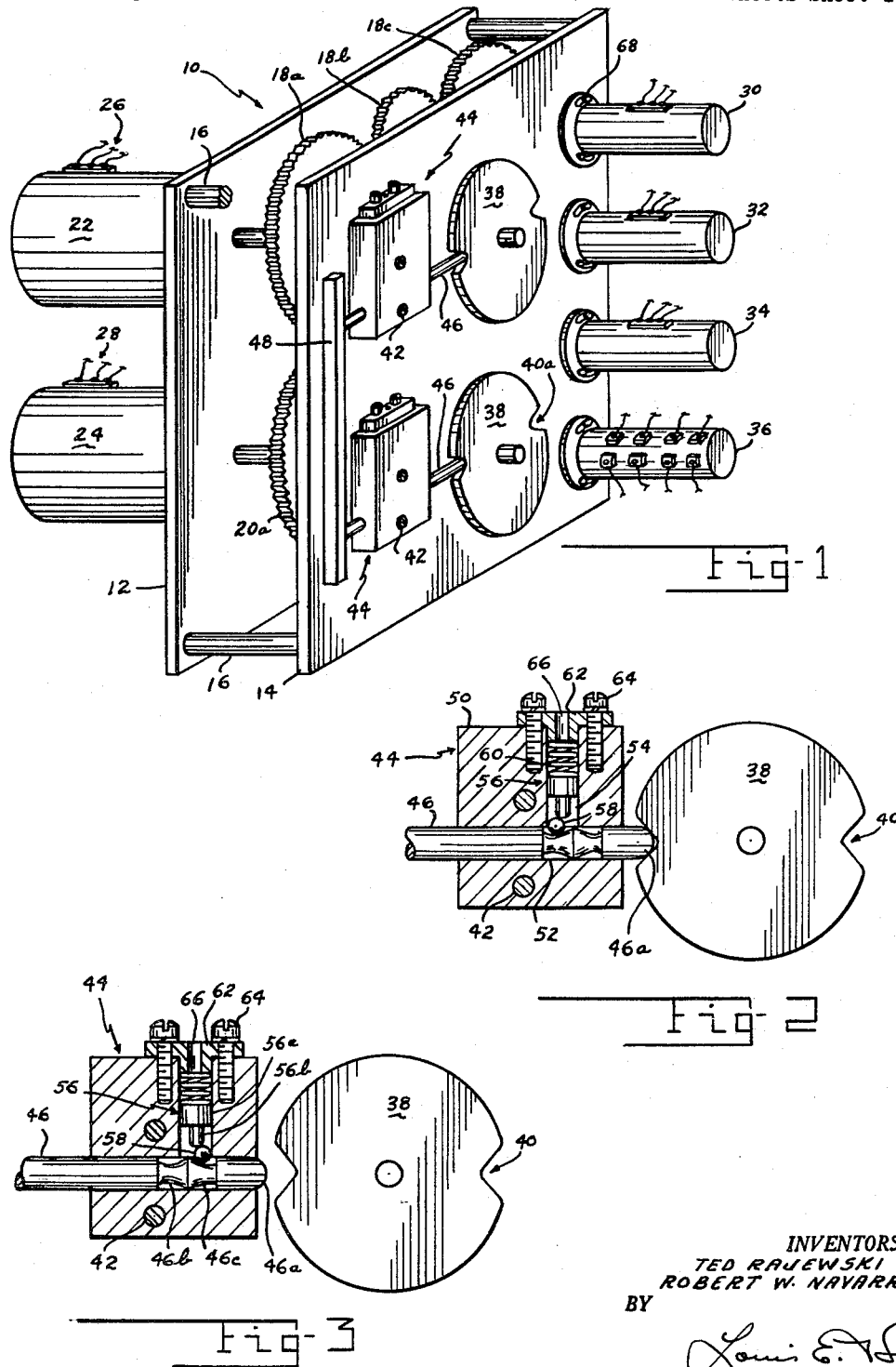

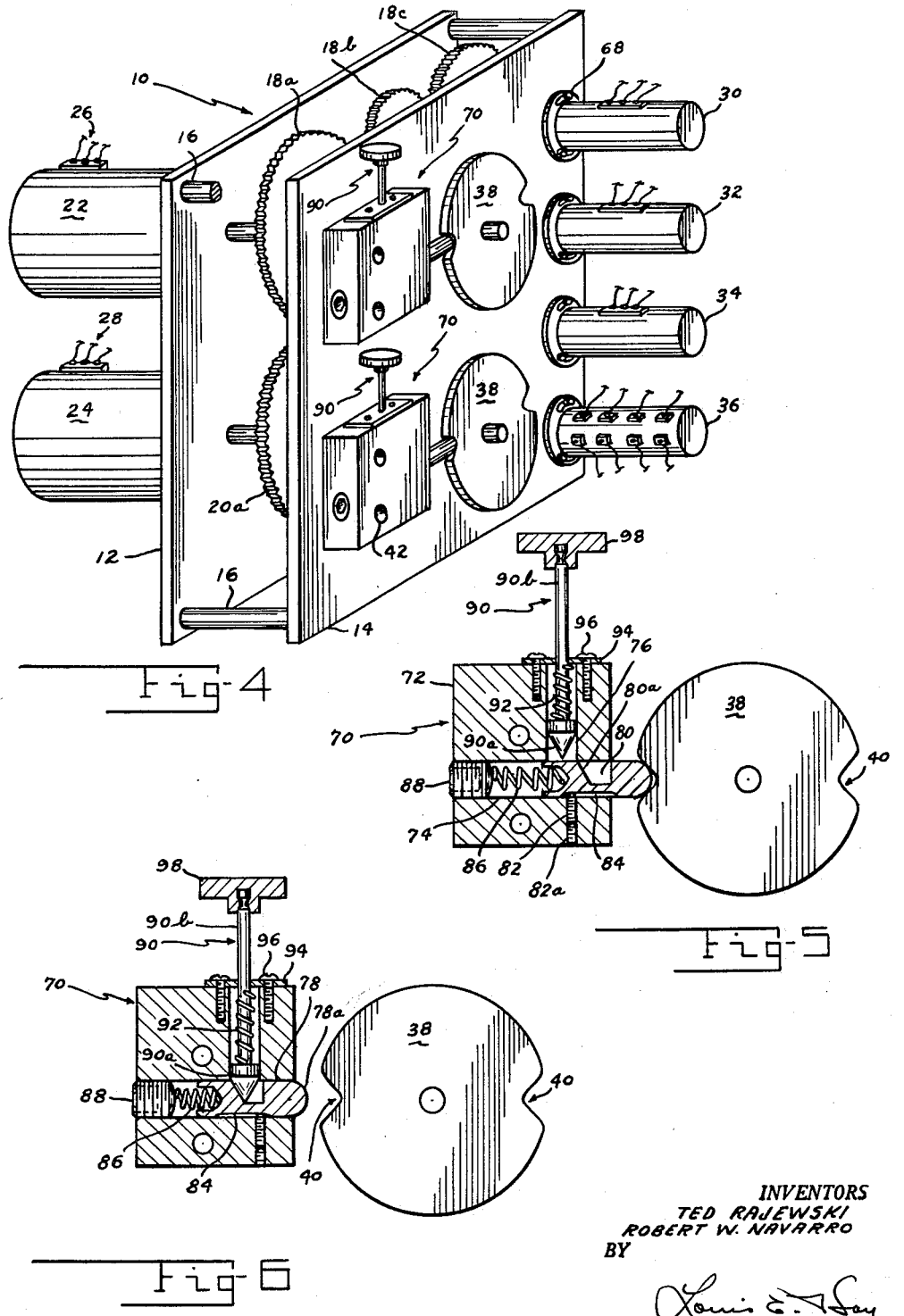

This invention relates to geared mechanisms for driving and coordinating various driven mechanical, electrical and electromechanical units. More specifically, the present invention relates to devices used to position the gear trains of such mechanisms to known positions which are used as zero or base reference positions against which the various driven units may be angularly adjusted and synchronized.

Many classes of apparatus such as scanners, fire control systems, monitoring system and computing systems include input driven gear trains for driving units which are coordinated rotationally for the designed simultaneous and/or sequential functions.

Gear train components and the units driven by such trains are often purchased from various manufacturers and assembled into a final assembly. Provision must be made, on such an assembly composed of a conglomeration of parts, for synchronizing the output of the driven units to a given input gear position. The synchronization problem remains equally critical when a single manufacturer builds all elements going into the conglomeration. Such manufacturer must either build all elements to such extremely close tolerances as would make the cost prohibitive or, as an alternative, he must provide adjusting means for the synchronization of the various components.

An indexing device such as the subject invention is also extremely useful when adjusting out the effect of gear lash and normal wear in the gear train. The indexing device is also extremely useful when making necessary and periodic synchronization checks.

The primary object of this invention is to provide a simple, low cost indexing device for positioning a gear train to a reference position.

Another object of this invention is to provide an indexing device which will not interfere with the normal operation of the geared mechanism.

A further object of this invention is to provide an indexing device which, if inadvertently left in engagement with the gear train, will be disengaged when the gear train commences to rotate.

Yet another object of this invention is to provide an indexing device which is readily mountable on currently-designed geared mechanisms, with a minimum or no change to such geared mechanism.

While for the purposes of illustration, the present invention to be shown and described is in connection with a geared mechanism whose input positions may be established from the position of a radar scanning device for example; it is to be strictly understood by all, that such illustration and description is in no way to be construed as limiting the scope and application of the invention. Accordingly, additional objects, advantages and features of the invention reside in the construction, arrangement and combination of parts involved in the embodiment of the invention as will appear from the following description and accompanying drawings, wherein:

FIG. 1 is a perspective schematic elevation of a preferred embodiment showing a plurality of indexing devices in operable position on a geared mechanism.

FIG. 2 is an elevation, partially in section, showing the plunger of the device shown in FIG. 1 in engagement with a detent of the rotary disk joined to a rotating shaft of the geared mechanism.

FIG. 3 is an elevation, similar to FIG. 2, showing the plunger of the device in the disengaged or retracted position.

FIG. 4 is a perspective schematic elevation of another embodiment of the invention showing a plurality of the indexing devices in operable position on a geared mechanism.

FIG. 5 is an elevation, partially in section, showing the plunger of the device shown on FIG. 4 in engagement with a detent of the rotary disk joined to a rotating shaft of the geared mechanism.

FIG. 6 is an elevation, similar to FIG. 5, showing the plunger in the disengaged or retracted position.

Referring to FIG. 1, FIG. 2 and FIG. 3, the geared mechanism referred to generally as 10 has a main housing structure comprising a first plate member 12 and a second plate member 14 held in separated spaced relationship by tie bars 16. Housed within the housing structure are a plurality of gear trains. Three gears, gear 18a, gear 18b and gear 18c of the upper gear train are visible. Gear 20a of the lower gear train is visible. The upper gear train is positioned by synchro 22 and the lower gear train is positioned by synchro 24. Synchros 22 and 24 are in electrical communication through wires 26 and 28 with companion synchros, not shown, which are positioned by a radar scanning device, which is not shown or claimed as a part of this invention.

The upper gear train represented by gears 18a, 18b and 18c imparts rotary motion to potentiometers 30 and 32 which are connected to electrical circuitry, not shown, and not a necessary part of this invention. The lower gear train represented by gear 20a imparts rotary motion to potentiometer 34 and sequence switch 36 which are also connected to electrical circuitry, not shown, and not a necessary part of this invention.

Joined to any conveniently extended shaft of each gear trains is a rotary disk 38, each of which has one or more radially symmetrical V-shaped detents 40. Mounted on the face of second plate member 14 and in spaced relationship with each rotary disk 38 is a plunger assembly 44 held in place by screws 42. A plunger rod 46 passing through each plunger assembly is joined to a common actuating bar 48.

Although the rotary disk 38 may be joined to or may be an integral part of any convenient rotating element of the gear train assembly, it must be so located that when plunger rod 46 is extended to be properly seated in detent 40, the armature of the synchro positioning the gear train will be at a fixed known position. Any one of numerous methods well known to the art may be used to establish the proper relationship.

The plunger rods 46 are shown joined to a common actuating bar 48, however, the bar may be replaced by operating knobs for individual actuation, if desired. Such operating knobs may be similar to the knob 98 shown on FIG. 6.

Referring in particular to FIG. 2 and FIG. 3, each plunger assembly has a body 50 containing a first bore 52 for slidably receiving plunger rod 46. At right angle to bore 52 is a second bore 54 for slidably receiving latch pin 56. Latch pin 56 comprises a major cylindrical portion 56a slidable within bore 54 and a coaxial reduced diameter pin 56b which terminates in a spherical end for engagement with ball 58. A compression spring 60 above latch pin 56 is retained within bore 54 by retainer 62 and is biased to hold the latch pin against the ball by resiliently applied force. Retainer 62 is joined to body 50 by means of screws 64. The retainer has a vent 66 to prevent an influencing pressure rise as the latch pin 56 moves upward within bore 54.

Plunger rod 46, which may be of any convenient length, terminates in a spherical end 46a for engaging detent 40 of rotary disk 38 when the plunger rod is extended as shown on FIG. 2. Located on plunger rod 46 in a position for functional relationship with latch pin 56 and ball 58 are two conical base-to-base cam surfaces 46b and 46c. When the plunger rod 46 is in engagement with detent 40 of the rotary disk 38 as shown on FIG. 2, and with the axis of the latch pin 56 forward of the vertical diameter through ball 58, the ball is wedged in the position shown to hold the plunger rod in the engaged position. When the plunger rod 46 is withdrawn from engagement to the retracted position shown in FIG. 3, the relative positions of the ball and the latch pin reverse and the plunger rod is held in the withdrawn position. If desired, suitable stops may be provided to prevent the complete withdrawal of the plunger rod from body 50. The configuration and design of the cam surfaces on the plunger rod in relationship to the ball and latch pin provides a "snap action" as the high point between the two cam surfaces crosses the vertical center line through the ball. The plunger assembly 44 is mounted in such position that, with the plunger rod retracted to the position shown on FIG. 3, the tip of spherical end 46a will slightly clear the perimeter of the rotary disk 38.

In operation, when it is desired to synchronize the equipment, the gear trains are rotated to the proper position permitting each plunger rod to engage the detent in the corresponding rotary disk. Each individual driven unit such as potentiometer 30 may be angularly adjusted to the correct electrical signal by loosening screws 68 and rotating the unit to its proper position, after which the screws 68 are tightened. As depicted by FIG. 1, each rotary disk has a plurality of V-shaped detents 40. The number of and the angular location of the detents is determined for each particular application. Let it be presumed, for example, that all potentiometers 30, 32 and 34 may be synchronized with the rotary disks in the positions shown, and that sequence switch 36 is to be synchronized from the alternate detent 40a on the lower rotary disk. With both plunger assemblies operating from a common actuating bar 48, a "dummy" detent must be provided in the upper disk. "Dummy" detents are not required when the plunger assemblies are individually actuated. After the equipment is synchronized, the plunger rods are disengaged from the detents in the rotary disk and are retracted to the position shown on FIG. 3.

The shape of detent 40 in combination with the spherical end 46a on plunger rod 46 is such as will automatically produce the disengagement of the plunger rod in case the plunger rod is inadvertently left in engagement with the detent after completion of synchronization. As the rotary disk rotates in either direction, the plunger rod commences to move in the withdrawal direction, and after the high point between cam surfaces 46b and 46c crosses the vertical center line of the ball 58, the plunger rod will go to the withdrawn position by "snap action."

Another embodiment of this invention is shown on FIG. 4, FIG. 5 and FIG. 6 in which like parts from the first embodiment have like numbers. The changes in the embodiment to be described over the embodiment previously described reside in plunger assembly 70. The plunger assembly consists of a body 72 having a first bore 74 and a second bore 76 at right angles to the first bore. A plunger rod 78 having a spherical end 78a is axially slidable within bore 74. A slot 80, having a tapered side 80a, is milled transverse to the longitudinal axis of the plunger rod 78. The plunger rod 78 is held in rotary alignment within bore 74 in a manner well known to the art by means of screw 82 which engages longitudinal slot 84 in the plunger rod. Screw 82 may be locked in place by screw 82a. Longitudinal slot 84 also retains the plunger rod within body 72 while permitting necessary longitudinal travel. The plunger rod is biased in the extended position by means of compression spring 86 within bore 74 where it is retained by screw plug 88.

Sear rod 90, having a conically pointed head 90a and a stem 90b is operable within bore 76 where it is biased in the downward direction by compression spring 92. The compression spring which surrounds stem 90b is retained within bore 76 by plate 94 which has the dual function of retaining the spring and of guiding the sear rod 90. Plate 94 is joined to body 72 by means of screws 96. A suitable knob 98 is molded to the end of stem 90b.

The general procedure for synchronizing equipment using the present embodiment of the invention is as previously described. The plunger rod 78 which is shown in the normally retracted position by FIG. 6 may be released by lifting the sear rod 90 to disengage the conically pointed head 90a from the angular face 80a on the plunger rod. The plunger rod may be manually withdrawn from engagement with detent 40 of the rotary disk to permit the sear rod to re-engage the angular face 80a. If the plunger rod is inadvertently left in engagement after completion of the synchronization, the plunger rod will become disengaged from the detent when the rotary disk rotates, in a manner much like that in the first embodiment. As the plunger rod retracts, the pointed head of the spring biased sear rod again engages and holds the plunger rod in the retracted position.

It is to be understood that the embodiments of the present invention as shown and described are to be regarded as illustrative only and that the invention is susceptible to variations, modifications and changes within the scope of the appended claims.

We claim:

1. A device for indexing a gear train assembly or the like to a known position comprising: a housing structure, a gear train assembly within said housing structure and having a shaft extending through said housing structure, a rotary disk joined to the extending shaft of said gear train assembly and having at least one V-shaped detent in the periphery of said rotary disk at right angle to the axis of rotation of said extending shaft, each of said detents being radially symmetrical on said rotary disk, and a nonrotating plunger assembly joined to said housing structure in fixed relationship to said rotary disk, said plunger assembly comprising a body having a first bore and a second bore at right angle to said first bore, a plunger journaled within said first bore and having a spherical end axially extendable in said body to engage a detent in said rotary disk and retractable in said body to be disengaged from said rotary disk, said plunger having two conical base-to-base cam surfaces in spaced relationship to said second bore in said body, and snap-action latch means within said second bore and engaging the base-to-base cam surfaces on said plunger for biasing said plunger to either the extended or retracted position, said plunger when engaging a detent in said rotary disk being moved by the subsequent rotation of said rotary disk by said gear train assembly to the disengaged position.

2. A device for indexing a gear train assembly or the like in accordance with claim 1 in which said snap-action latch means comprises: a ball contacting the cam surfaces on said plunger, a compression spring, and a latch pin disposed between said compression spring and said ball.

(References on following page)

References Cited by the Examiner

UNITED STATES PATENTS

| | | | |
|---|---|---|---|
| 220,783 | 10/79 | Baird et al. | 74—55 |
| 891,800 | 6/08 | Enrico. | |
| 1,387,156 | 8/21 | Igo et al. | 188—31 X |
| 2,407,696 | 9/46 | Webster | 74—527 |
| 2,515,944 | 7/50 | Bennett | 310—49 |
| 2,573,199 | 10/51 | Holman | 74—527 |
| 3,021,587 | 2/62 | Rudbarg | 74—55 |

FOREIGN PATENTS

| | | |
|---|---|---|
| 797,041 | 6/58 | Great Britain. |
| 275,591 | 6/30 | Italy. |

BROUGHTON G. DURHAM, *Primary Examiner.*